(12) United States Patent
Gelfant et al.

(10) Patent No.: US 10,330,833 B2
(45) Date of Patent: *Jun. 25, 2019

(54) AGGLOMERATED RETROREFLECTIVE BEADS FOR PAVEMENT MARKING AND METHODS FOR FABRICATION AND USE THEREOF

(71) Applicant: StonCor Group, Inc., Maple Shade, NJ (US)

(72) Inventors: Frederick Gelfant, Mount Laurel, NJ (US); John Mulowski, Millville, NJ (US); Kent Stough, Jr., Jobstown, NJ (US)

(73) Assignee: StonCor Group, Inc., Maple Shade, NJ (US)

( * ) Notice: Subject to any disclaimer, the term of this patent is extended or adjusted under 35 U.S.C. 154(b) by 156 days.

This patent is subject to a terminal disclaimer.

(21) Appl. No.: 14/957,903

(22) Filed: Dec. 3, 2015

(65) Prior Publication Data

US 2016/0154149 A1   Jun. 2, 2016

Related U.S. Application Data

(60) Division of application No. 13/833,747, filed on Mar. 15, 2013, now Pat. No. 9,207,373, which is a
(Continued)

(51) Int. Cl.
*G02B 5/128* (2006.01)
*G02B 5/126* (2006.01)
(Continued)

(52) U.S. Cl.
CPC .......... *G02B 5/13* (2013.01); *B29D 11/00605* (2013.01); *E01F 9/512* (2016.02);
(Continued)

(58) Field of Classification Search
CPC ........ B29D 11/00605; B29D 11/00615; G02B 5/13; G02B 5/136; G02B 5/126; G02B 1/12; G02B 5/00; G02B 5/063; G02B 5/22; G02B 5/124; G02B 5/128; E01F 9/044; E01F 9/40; E01F 9/506; E01F 9/512; E01F 9/518; E01F 9/524; E01F 9/619; E01F 9/669; C08G 18/10; C08G 18/42; C08G 18/44; C08G 18/48; C08G 18/58; C08G 18/61; C08G 18/3234; C08G 18/325; C08G 18/672; C08G 18/673; C08G 18/718; C08G 18/2875; C08G 18/3256; C08G 18/3821;
(Continued)

(56) References Cited

U.S. PATENT DOCUMENTS

| | | | | |
|---|---|---|---|---|
| 3,894,791 A * | 7/1975 | Eigenmann | ............ | G02B 5/128 359/535 |
| 5,731,369 A * | 3/1998 | Mahoney | ............... | C08G 59/62 427/137 |
| 7,874,686 B2 * | 1/2011 | Rossner | ................ | B29C 70/585 264/1.9 |

* cited by examiner

*Primary Examiner* — Mustak Choudhury
(74) *Attorney, Agent, or Firm* — Fox Rothschild LLP

(57) ABSTRACT

A retroreflective device securable to a highway by bonding thereto preferably with a viscous strip applied to the highway prior to solidifying cure of the strip includes a generally globular glass central member, a desirably pigmented adhesive layer over the central member and a plurality of peripheral globular glass members connected to the central member by the pigmented adhesive layer. A method for fabricating the retroreflective device is also disclosed.

18 Claims, 3 Drawing Sheets

Related U.S. Application Data continuation-in-part of application No. 13/590,729, filed on Aug. 21, 2012, which is a division of application No. 11/789,421, filed on Apr. 10, 2007, now Pat. No. 8,292,539.

(51) Int. Cl.
| | | |
|---|---|---|
| *G02B 5/13* | (2006.01) | |
| *G02B 1/12* | (2006.01) | |
| *G02B 5/136* | (2006.01) | |
| *B29D 11/00* | (2006.01) | |
| *E01F 9/524* | (2016.01) | |
| *E01F 9/512* | (2016.01) | |
| *E01F 9/518* | (2016.01) | |

(52) U.S. Cl.
CPC .............. *E01F 9/518* (2016.02); *E01F 9/524* (2016.02); *G02B 1/12* (2013.01); *G02B 5/126* (2013.01); *G02B 5/136* (2013.01)

(58) Field of Classification Search
CPC ............ C08G 18/4219; C08G 18/4854; C08G 18/5021; C08G 18/5024; C08G 18/6685; C08G 18/8116; B29C 70/64; B29C 70/585; B24D 11/001; B24D 11/02; C03C 3/127; C03C 10/00; C03C 10/0045; C03C 12/02
USPC ................ 359/515, 529, 530, 534–540, 900; 350/104, 105; 428/168, 172, 195, 325, 428/328, 329, 331, 402
See application file for complete search history.

AGGLOMERATED RETROREFLECTIVE BEADS FOR PAVEMENT MARKING AND METHODS FOR FABRICATION AND USE THEREOF

CROSS-REFERENCE TO RELATED PATENT APPLICATIONS

This patent application is filed under 35 USC 120 as a division of pending U.S. patent application Ser. No. 13/833,747 filed 15 Mar. 2015 and published as US 2013-0215510 A1, entitled Methods for Fabrication and Highway Marking Usage of Agglomerated Retroreflective Beads. The '747 application is a continuation-in-part of pending U.S. patent application Ser. No. 13/590,729, filed 21 Aug. 2012 and published as US 2012-0315087 A1, entitled "Methods for Fabrication and Highway Marking Usage of Agglomerated Retroreflective Beads" which in turn is a division of U.S. patent application Ser. No. 11/789,421, now U.S. Pat. No. 8,292,539, granted 23 Oct. 2012, entitled "Agglomerated Retroreflective Beads for Highway Marking and Methods for Fabrication and Use Thereof." The priority of the '747 application, the '729 application and the '539 patent is claimed under 35 USC 120. The disclosures of all of these preceding applications and patent are hereby incorporated herein by reference in their entireties, to the extent permitted under applicable law.

BACKGROUND OF THE INVENTION

Field of the Invention

This invention relates generally to highway striping and marking materials and specifically to retroreflective beads used in highway striping and marking materials to enhance visibility of the highway, where striped and marked, especially after sundown. The application further relates to pavements for vehicular travel thereon having striping of a curable viscous material and retroreflective elements embedded therein.

Description of Prior Art

Pavement markings such as paints, tapes, and individually mounted articles to guide and direct motorists traveling along a roadway are known. During daylight the markings may be sufficiently illuminated by ambient light to effectively signal and guide motorists. At night, especially when the primary source of illumination is the vehicle's headlights, the markings may be insufficient to guide adequately motorists because light from vehicle headlights hits the pavement and pavement markings at a very low angle of incidence, with the result that the light largely reflects away from the vehicle.

Retroreflection is the mechanism whereby light incident on a surface is reflected in a way that much of the incident light is directed back towards the light source. The most common retroreflective pavement markings, such as lane lines on roadways, are made by dropping transparent glass or ceramic optical elements onto a freshly painted line to which the optical elements adhere and desirably become partially embedded therein. Each transparent optical element preferably acts as a spherical lens. Incident light desirably passes through the optical elements to the pavement marking paint or sheet, striking any pigment particles embedded therein. The pigment particles scatter the light. The scattered light includes a portion that is directed back into the optical element, which then redirects that portion of light back towards the light source.

In addition to providing desired optical effects, pavement markings must withstand road traffic, and adverse weather conditions, and are subject to cost constraints in the course of manufacture and installation.

Vertically oriented or upwardly disposed surfaces provide good orientation for retroreflection. As a result, attempts have been made to incorporate vertical surfaces in pavement markings, such as by providing protrusions in the marking surface. Vertical surfaces may advantageously prevent build-up of water over the retroreflective surface during rainy weather, which water would otherwise interfere with retroreflection.

Sometimes raised pavement markers are placed at intervals along a pavement marking line as disclosed in U.S. Pat. Nos. 3,292,507 and 4,875,798. These markers are relatively large, generally being several centimeters in width, and five to twenty millimeters in height. Typically, such markers require assembly of different components, some of which were previously individually molded or cast. Therefore, such markers are relatively expensive to manufacture. The size of the markers makes them subject to substantial impact forces from passing vehicles. As a result, the markers must be well secured to the pavement, increasing installation costs and also removal costs when the markers must be replaced. Moreover, because the markers are applied at intervals, the reflected light provided by the markers are in the form of discontinuous spots of light. A continuous bright line of reflective light is more desirable.

Embossed pavement marking tapes, as disclosed in U.S. Pat. Nos. 4,069,281 and 5,417,515, represent an approach that has been taken towards providing better highway marking surfaces. Selective placement of transparent optical elements on the sides of embossed raised protrusions present in the tapes results in somewhat effective marking. However, such tapes are relatively expensive compared to painted markings and tend to pick up dirt that adheres to the tape even after a hard rain. As a result, tape usage is often limited lower traffic areas such as unlighted intersections and railway crossings. These embossed tapes are constructed of polymeric materials which are susceptible to wear.

Yet another approach to providing retroreflection is the composite retroreflective element such as disclosed in U.S. Pat. Nos. 3,254,563 and 4,983,458. These retroreflective elements essentially have a core with optical elements embedded in the core surface. Some also contain optical elements dispersed throughout the core that become exposed with wear. The core may be irregular in shape or may be shaped as a sphere, tetrahedron, disc, square, tile, etc.

Some known retroreflective elements have centers formed of polymeric cores or binders. A pigmented core or binder may serve as a diffuse reflector, allowing spherical optical elements to be used on horizontal and vertical surfaces. Other constructions have transparent optical elements including specular reflectors such as metallic silver. The metallic surface directs light back towards the light source. In such cases pigmented cores are not used. Geometry of the optics may make a specular coated optical element less effective when embedded in pavement marking paint on a horizontal surface, and more effective when embedded in the vertical surfaces of a retroreflective support element.

Another retroreflective element construction, disclosed in U.S. Pat. No. 3,252,376, uses silvered glass flakes as a specular reflector on the surface of a spherical polymeric core; no spherical optical elements are used.

Still another known construction disclosed in U.S. Pat. Nos. 4,072,403; 4,652,172 and 5,268,789 has a retroreflective element with a plastic globule refracting incident light onto a layer of glass optical elements attached to the bottom of the globule. The glass optical elements focus light onto a specular coating or film located below the elements. Incident light is then reflected back along the original path towards the source.

Shaped polymeric retroreflective elements with pigmented cores and glass optical elements embedded in the vertical surfaces are disclosed in U.S. Pat. No. 3,418,896. These retroreflective elements are formed by extruding pigmented polymer into rods of different cross-sectional shapes. Glass optical elements are embedded into the surface of the polymer before it hardens, then the rods are sliced to form the elements.

Polymeric retroreflective elements are undesirably susceptible to wear, especially in high traffic regions, and to degradation due to weathering.

In an attempt to overcome these limitations, retroreflective elements have been constructed having a ceramic core surrounded by optical glass with a metallic specular coating.

One such construction approach is a rock or glass sphere core as disclosed in U.S. Pat. Nos. 3,043,196 and 3,175,935, covered by a polymeric binder with glass optical elements having a specular metallic coating embedded in the polymeric coating.

Another construction disclosed in U.S. Pat. No. 3,556,637 includes a glass sphere and a layer of glass optical elements attached to the bottom of the glass sphere with a polymeric binder. A metallic film below the glass optical elements acts as a specular reflector. However, these glass sphere-metallic film combinations do not provide the brilliant white or yellow color for the reflective light that is desirable in a high quality highway marking and is necessary to meet the requirements of many regulatory authorities. The glass sphere-metallic film approach tends to produce reflected light that is grey or silver, instead of white, or that is bronze or gold, instead of yellow. None of these are acceptable.

Other constructions include a composite lens element serving both as a retroreflective element and a skid-resistant particle as disclosed in European patent 0,322,671. The skid-resistant particle, which acts as a core, may be either a corundum particle or glass sphere, and is coated with a pigmented polymeric binder acting as a diffuse reflector.

A ceramic element having glass optical elements embedded throughout a glass core and at the core surface is disclosed in U.S. Pat. No. 3,171,827. A thin metallic film separates the optical elements and the glass core to provide an efficient specular retroreflective system. Alternatively, optical elements having a refractive index greater than 2.0 are used. These high refractive index optical elements are asserted as being capable of reflecting light without the need for a reflective backing.

A ceramic retroreflective composite element having a transparent glass sphere with smaller glass optical elements embedded in the surface is disclosed in U.S. Pat. Nos. 3,274,888 and 3,486,952. A thin metallic film separates the optical elements and the glass sphere to provide specular retroreflective system. The elements are formed by first coating the glass spheres with metallized optical elements using a temporary polymeric binder. The coated spheres are then tumbled with excess optical elements in a rotary kiln. When temperature exceeds the softening temperature of the glass spheres, the optical elements embed themselves into the surface of the spheres. Later the film is etched away from the exposed portions of the optical elements.

WO 97/28471 discloses a retroreflective element having an opacified ceramic core and ceramic optical elements partially embedded in the core. The diffuse reflecting ceramic core, in combination with the transparent optical elements embedded in the surface, provides a retroreflective element asserted to be without the gray coloration and the susceptibility to corrosion associated with metallic specular reflectors. Although such all-ceramic retroreflective elements are asserted to have improved resistance to wear and weathering, crush-resistance remains a problem, limiting life of the retroreflective element.

Beads for highway marking are disclosed in U.S. Pat. Nos. 3,171,827 and 3,274,888. '827 discloses a bead with a polymer core, while '888 discloses beads consisting of all glass bonded to a glass core that is fabricated by melting these glass components together; there is no polymer core nor is any adhesive used.

U.S. Pat. No. 4,983,458 discloses a bead similar to that disclosed in '827, but having a tetrahedron shape intended to increase adhesion to highway marking tape. However, the '458 product does not function well with current reflective bead application equipment.

U.S. Pat. No. 5,456,546 discloses use of single glass beads in highway marking lines.

U.S. Pat. Nos. 5,774,265 and 5,917,652 disclose retroreflective elements. The elements are not white or yellow, which is desirable since white and yellow are the colors used for highway striping and are, in many instances, required by law. The retroreflective elements disclosed in '265 and '652 are expensive to manufacture.

U.S. Pat. No. 5,942,280 discloses a bead that is a variant of the beads disclosed in the '458 and '827 patents discussed above.

United States published applications 2005/0100709 and 2005/0158461 disclose beads that are similar to the beads disclosed in the '458; '827 and '546 patents discussed above, but the beads disclosed in these two pending patent applications are not all ceramic.

United States published application 2005/0001342 discloses an agglomeration of small beads without a core, manufactured by a slow, costly method.

SUMMARY OF THE INVENTION

In one of its aspects this invention provides an agglomerated bead for highway marking having high retroreflectivity both when initially installed and over the bead lifetime, allowing vehicle drivers to see highway marking lines at night. When installed the agglomerated beads essentially match the color of the highway marking material in which the agglomerated beads reside.

In one of its several aspects this invention provides a retroreflective device securable to a highway by bonding with a viscous strip applied to the highway prior to solidifying cure of the strip, where the device includes a generally globular glass central member, a pigmented adhesive layer over the central member, and a plurality of peripheral globular glass members connected to the central member by the pigmented adhesive layer. Preferably the central member is in the range of from about 14 to about 20 mesh and the peripheral members are in the range of from about 325 to about 400 mesh and further preferably cover the central member. Both the central member and the peripheral members are preferably of generally spherical configuration; the pigmented adhesive layer preferably includes both pigment and resin, with the pigmented layer preferably being less than the diameter of the peripheral glass members and where the pigmented layer preferably still further includes reagents that react adhesively during fabrication of the device to secure the peripheral members to the central member.

In yet another of its aspects this invention provides an agglomerated bead, which after significant traffic passage thereover, wears at the top of the agglomerate but maintains retroreflectivity with retroreflectivity largely being produced at the side of the agglomerated bead, and with the exposed core of the agglomerated bead itself being retroreflective.

The agglomerated beads may desirably be applied to a highway by trucks dropping exact amounts of the agglomerated beads on freshly applied highway marking line. The lines preferably utilize two component chemistries such as epoxy, epoxy hybrids, polyurethanes and polyureas. When the agglomerated beads are applied, the line is flooded with the agglomerated beads. The line is ready for traffic in two to ten minutes, depending on the specific line chemistry used. Alternatively, the agglomerated beads may be mixed with small, bare retroreflective beads.

It is further within the purview of the invention to apply the agglomerated beads to a highway by trucks dropping exact amounts of the agglomerated beads on freshly applied thermoplastic or latex paint.

Also included within the purview of this invention is a pavement for vehicular travel and storage thereon, having a load supporting layer selected from the group including concrete, asphalt and aggregates, a curable viscous material applied to an upper surface of the load supporting layer and a plurality of retroreflective elements having their lower portions embeddedly retained in the material, with their upper portions protruding above the surface of the material.

Further included within the purview of this invention is a method for enhancing visibility of boundaries, lane lines and the like on pavement including applying a curable viscous material to a selected pavement portion, such as a boundary, lane line, and the like, for which visibility is to be enhanced, in a thickness to embeddedly retain lower portions of generally globular retroreflective elements, applying the globular retroreflective elements to the material to an extent that the elements embed themselves sufficiently to be retained by the material when the material has cured, and permitting the material to cure thereby retaining the embedded globular retroreflective elements therein.

Formulation of the polymer coating and the adhesive layer affects performance. Blending steps in the manufacture of the agglomerated beads are preferably performed in a fluidized mixer to distribute all layers uniformly and rapidly.

Control of timing for the addition, mixing and curing of each reagent secures the desired properties of the final agglomerated bead product.

Agglomerated bead performance characteristics have been measured in several ways: color of the finished agglomerated bead; retroreflectivity of the bead by itself; retroreflectivity of the agglomerated bead in a painted highway marking line; color of the line after addition of the agglomerated beads as compared to color without agglomerated beads; retroreflectivity of the line after wear testing with traffic; and color of the line with agglomerated beads after wear testing. ASTM E1710 for retroreflectivity and ASTM E1349 for color are the test methods used.

DETAILED DESCRIPTION OF THE PREFERRED EMBODIMENTS OF THE INVENTION AND BEST MODE FOR PRACTICE THEREOF

Figure 1:
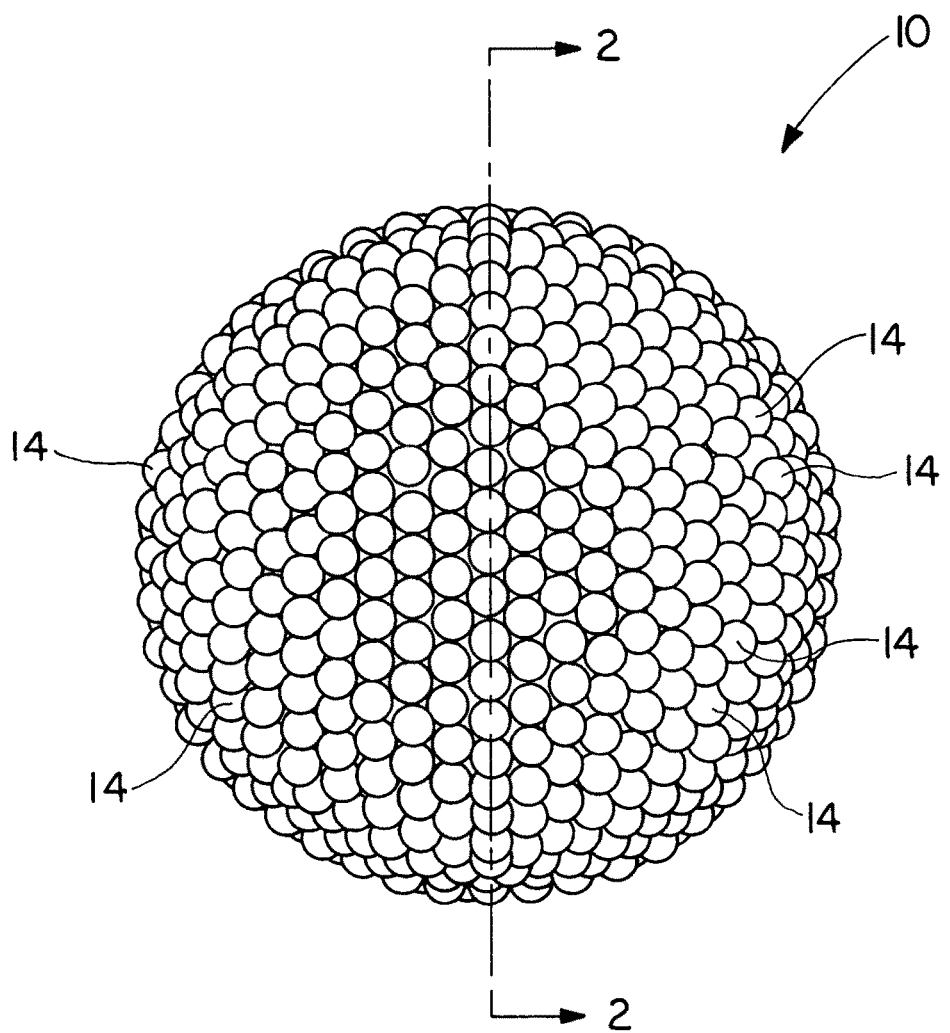
FIG. 1 is an artist's conception front elevation of an agglomerated retroreflective generally spherical glass media for highway marking in accordance with aspects of the invention.
Figure 2:
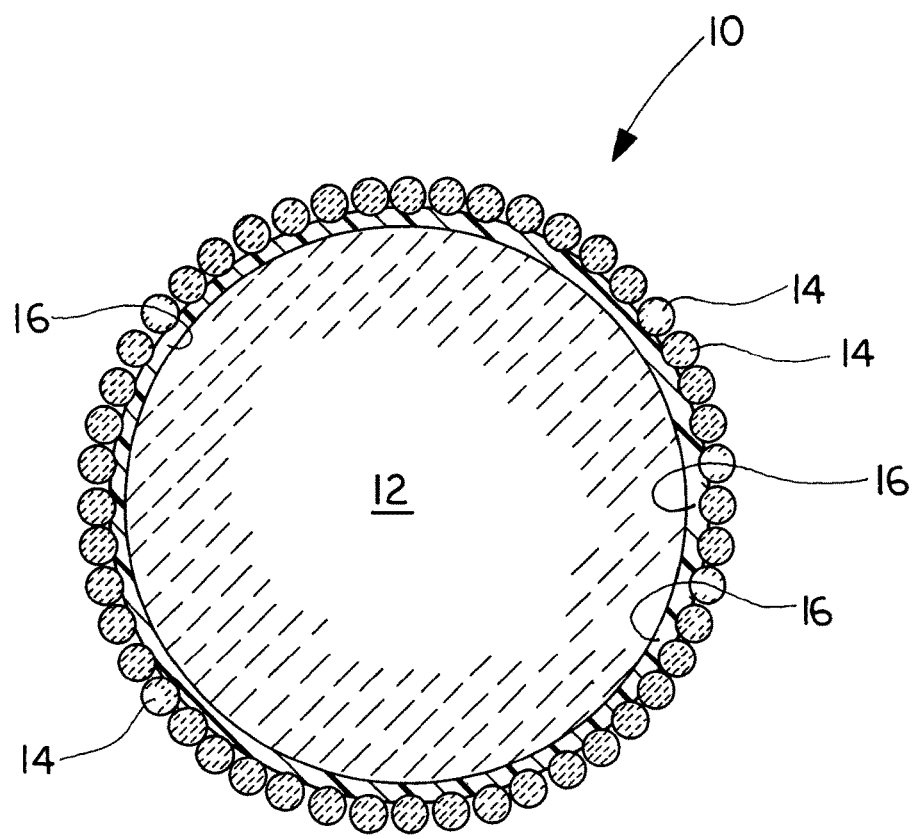
FIG. 2 is an artist's conception sectional view, taken at lines and arrows 2-2 in FIG. 1, of the agglomerated retroreflective generally spherical glass media shown in FIG. 1.
Figure 3:
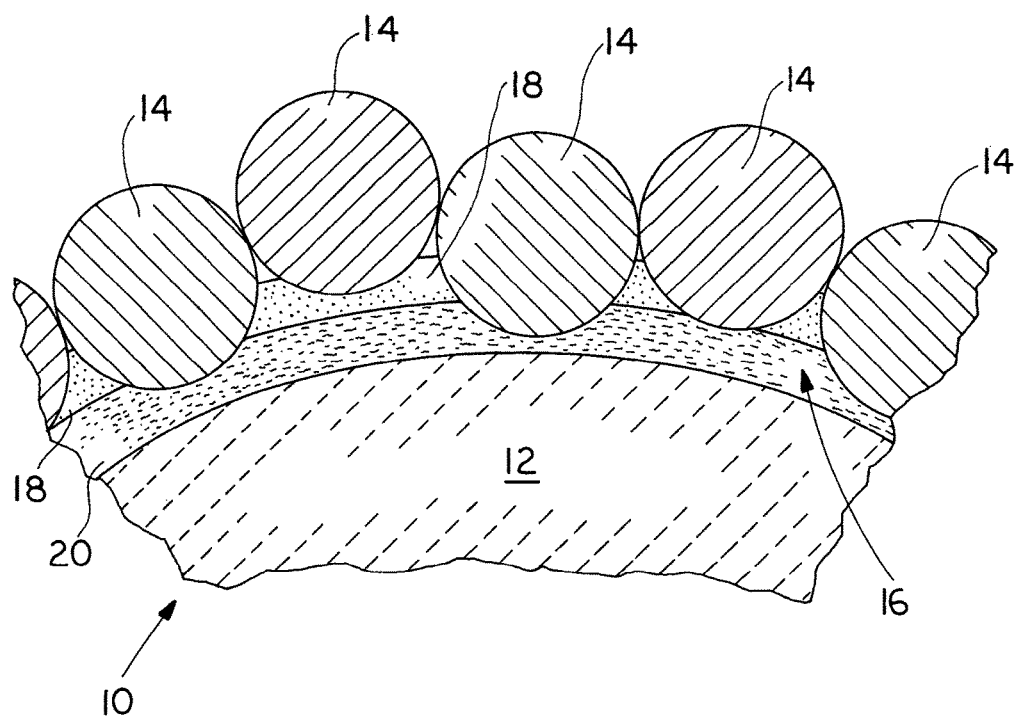
FIG. 3 is an artist's conception enlarged sectional view of a portion of the interior of an agglomerated retroreflective generally spherical glass media for highway marking in accordance with aspects of the invention, with the smaller exterior generally spherical glass members illustrated largely embedded in an interior pigmented adhesive layer that covers the larger interior generally spherical glass member, and with the interior pigmented layer shown schematically as comprising multiple layers, to reflect in schematic form the process by which the agglomerated reflective generally spherical glass media of the invention are fabricated.

Referring to FIGS. 1, 2 and 3, in FIG. 1 a single agglomerated retroreflective glass media in accordance with the invention is designated generally 10, with the exterior of agglomerated retroreflective glass media 10 being essentially completely covered and exclusively defined by smaller generally spherical glass members, individual ones of which have been designated 14 in FIG. 1.

Referring to FIG. 2, the interior of agglomerated retroreflective glass media 10 is defined by a relatively larger generally spherical central glass member designated 12. The smaller generally spherical glass members 14, defining the exterior of agglomerated retroreflective glass media 10 as illustrated in FIG. 1, are visible in FIG. 2. Securement of smaller generally spherical glass members 14 to relatively larger generally spherical central glass member 12 is effectuated by pigmented adhesive layer designated 16 in FIG. 2. Desirably, smaller generally spherical glass members 14 are sufficiently embedded in pigmented adhesive layer 16 that smaller generally spherical glass members 14 rigidly and fixedly form part of agglomerated retroreflective glass media 10.

As further illustrated schematically in FIG. 2, the smaller generally spherical glass members 14 are embedded in pigmented adhesive layer 16 but preferably are separated by pigmented adhesive layer 16 from the exterior of relatively larger generally spherical central glass member 12.

In FIG. 3, a broken portion of relatively larger generally spherical central glass member 12 is depicted with several of the smaller generally spherical central glass members 14 embedded in pigmented adhesive layer 16, but separated by pigmented adhesive layer 16 from the surface of relatively larger generally spherical central glass member 12. In FIG. 3, pigmented adhesive layer 16 is depicted as consisting of two separate layers, a first inner schematic layer contacting the exterior of central member 12 and designated generally 20, and a second outer schematic layer contacting and chemically reacting with first schematic layer 18 to produce the pigmented adhesive layer 16. It is to be understood that depiction of first and second schematic layers 18, 20 in FIG. 3 is solely for purposes of depicting, in schematic form, aspects of the process of the invention for fabricating the agglomerated retroreflective glass media 10. Upon microscopic inspection, one would see a pigmented adhesive layer 16 much like that depicted schematically in FIG. 2; it would not be expected that one would see discrete separate layers, such as illustrated 18, 20 in FIG. 3, upon microscopic inspection of an agglomerated retroreflective glass media 10 according to the invention.

Average diameter of the relatively larger generally spherical central glass member designated 12 in the drawings is preferably about 1.2 millimeters. A preferable, acceptable range for that diameter is 0.85 millimeters to 1.4 millimeters. The extremity of the range for the diameter of the relatively larger generally spherical central glass member designated 12 in the drawings is preferably from about 0.6 to about 2.0 millimeters.

The preferable average diameter for the smaller generally spherical glass members designated 14 in the drawings is 40 micrometers. The preferable range of diameter for the smaller generally spherical glass members designated 14 in the drawings is from about 30 micrometers to about 60 micrometers. Preferably, diameter of the smaller generally spherical glass members designated 14 in the drawings can range low as about 20 to as high as about 100 micrometers without adversely affecting practice of the invention.

The pigmented adhesive layer designated 16 in the drawings, which it is to be emphasized represents all of the reagents applied to the relatively larger generally spherical central glass member, preferably averages about 15 micrometers in thickness. A preferred range of thickness for the pigmented adhesive layer designated 16 in the drawings is from about 10 micrometers to about 40 micrometers. The pigmented adhesive layer designated 16 in the drawings could preferably range in thickness from as low as about 10 to as high as about 100 micrometers in thickness without adversely affecting performance of the invention. Thickness of pigmented adhesive layer 16 is preferably between about 30% and about 50% of the diameter of smaller generally spherical glass members 14.

In one preferred practice of fabricating retroreflective glass media according to the invention, where the glass media 10 consists of larger central globular glass members 12, each having a plurality of smaller globular glass members 14 connected to the central member 12, and the media are useful for highway marking, the process commences with assembling a supply of largely spherical, essentially clear, relatively larger globular glass members referred to sometimes herein as "beads". Suitable amounts of a first silane and water are added and the resulting combination is mixed for about thirty (30) seconds. Resin and water (to accelerate) are added and the resulting mixture blended again for about thirty (30) seconds. Next, dry pigment is then added, with the pigment being either white if a white color is desired, or a combination of white and yellow pigment if a yellow color is desired, and the resulting combination blended for about one-hundred twenty (120) seconds. A crosslinker-blend comprising a cross-linker, a second preferred silane, and a plasticizer, all of which have already been mixed, is then added and the newly resulting mixture blended for about seventy-five (75) seconds. Next the smaller glass members, that are preferably generally spherical or at least rounded in form, are added and the resulting mixture blended for about thirty (30) seconds. Finally, an anti-wicking agent is added and the resulting mixture blended for about forty-five (45) seconds. The anti-wicking agent is a temporary coating that prevents the two-component epoxy or polyurea liquid paint applied to the road, onto which the beads are applied or dropped, from wicking up the sides of the agglomerated beads and encapsulating the small beads which would otherwise prevent the small beads from contributing to the retroreflectivity of the product. This allows for higher retroreflectivity results on the road as more of the smaller beads are exposed. The anti-wicking agent is not permanent and will wear away with age, when in service. An additional advantage of using the anti-wicking agent is that it allows the agglomerate, namely the agglomerated beads, to sink into the coating sufficiently to maintain adhesion to the road paint, and does not prevent adhesion between the agglomerated bead outer surface and the road paint.

In this practice of the invention all of the processing, including mixing of the various reagents, allowing time for the pigment and other reagents to cover the initial group of larger beads and for the chemical reactions to occur causing adherence of the small spherical glass members to the larger glass beads, occurs completely over a period of about five and one-half minutes. All of these steps are performed at ambient conditions, typically at room temperature when performed indoors.

In a more specific preferred practice for fabricating retroreflective glass media according to the invention, where the retroreflective glass media comprise larger central generally spherical glass members with each having a plurality of smaller generally spherical glass members connected to the central member, for providing either white or yellow, according to the pigment(s) selected, reflected light when used for highway marking, the method includes assembling a supply of generally spherical essentially clear larger glass members that will amount to about 1000 parts by weight relative to the other reagents. Between zero (0) and about two (2) parts by weight of a first silane and between about zero (0) and about one (1) part by weight of water are blended with the supply of the larger, spherical glass members into a mixture. Next, from about four (4) to about twenty (20) parts by weight of resin and about one-tenth (0.1) to about two-tenths (0.2) parts by weight of an accelerator (water is the preferred accelerator) are blended into the mixture. Subsequently, from about two (2) to about thirty (30) parts by weight of one or more selected pigments are blended into the mixture. Next the crosslinker-blend comprising from about zero (0) to about three (3) parts by weight of plasticizer; from about six (6) to about thirty (30) parts by weight of a crosslinker and from about zero (0) to about two (2) parts by weight of a second silane, all of which have previously been mixed together, are blended into the mixture, whereupon from about two hundred (200) to about four hundred (400) parts by weight of the smaller glass members are blended into the mixture until the larger generally spherical glass members are substantially covered by the smaller members and the smaller members are secured to the larger members by a layer comprising the first silane and water, the resin and accelerator, the pigment, the crosslinker-blend. Finally from about one-tenth (0.1) to about one-half (0.5) by weight of an anti-wicking agent is blended into the mixture.

In a still more preferred practice of the invention, the first silane may comprise from about one-half (0.5) to about one (1) part by weight; the water may comprise from about one-tenth (0.1) to about one-half (0.5) part by weight; the resin may comprise from about five (5) to about twelve (12) parts by weight and the water (as an accelerator) may comprise from about one-tenth (0.1) to about two-tenths (0.2) parts by weight; the pigment may comprise from about five (5) to about fifteen (15) parts by weight; the crosslinker-blend may be comprised of from about two-tenths (0.2) of one part to about two (2) parts by weight of a plasticizer; from about six (6) to about twelve (12) parts by weight of a crosslinker and from about one-half (0.5) of one part to about one part by weight of a second silane, all of which have been previously mixed together the smaller generally spherical glass members may comprise about two hundred (200) parts by weight; and the anti-wicking agent may comprise from about one-tenth (0.1) to about one-half (0.5) parts by weight, all relative to 1000 parts by weight of large beads.

In an even more preferred version of the inventive method for fabricating agglomerated retroreflective glass media consisting of larger central essentially spherical glass members, each having a plurality of smaller spherical glass members connected to the central member, for providing either white or yellow reflective light, according to the color desired, when used for highway marking, the first silane is preferably about one part by weight relative to 1000 parts by weight of large beads; the water is preferably about one-quarter (0.25) of one part by weight; the resin is preferably about nine (9) parts by weight, the water (as an accelerator) is preferably about one-tenth (0.1) of one part to about two-tenths (0.2) of one part by weight; the pigment is preferably about twelve (12) parts by weight; the crosslinker-blend is comprised of preferably about four-tenths (0.4) of one part by weight of plasticizer, preferably about ten (10) parts by weight of crosslinker and preferably about one (1) part by weight of the second silane; all relative to 1000 parts by weight of large beads, the smaller glass spheres may be in parts by weight relative to 1000 parts by weight of large beads and the anti-wicking agent is preferably about four-tenths (0.4) by weight, relative to 1000 parts by weight of large beads.

In an alternate, equally preferred practice for fabricating retroreflective glass media according to the invention, where the glass media comprise larger central generally spherical glass members each having a plurality of smaller generally spherical glass members connected to the central member, and the media are useful for highway marking, the process commences with assembling a supply of generally spherical, essentially clear, relatively larger glass members referred to sometimes herein as "beads", as noted above. Suitable amounts of a first silane and water are added and the resulting combination is mixed for thirty (30) seconds.

Resin and water (as an accelerator) are then added, and blended with the combination for about thirty (30) seconds.

Next, one or more selected dry pigments may be added and the resulting mixture blended for about one hundred twenty (120) seconds.

Next, the crosslinker-blend (comprising plasticizer, crosslinker and a second preferred silane, all previously mixed together) is then added and blended for about seventy-five (75) seconds. During this seventy-five (75) second blending period, at about the thirty (30) second mark, about ten percent (10%) to twenty percent (20%) of the totality of the smaller glass members used in the process, which are also preferably generally spherical in form, are sprinkled into mixture over the course of the remaining forty-five (45) seconds of blending time. Next, the remaining portion of the smaller glass members are added en mass and the resulting mixture is blended for thirty (30) seconds.

Finally, the anti-wicking agent is added and the resulting mixture blended for about forty-five (45) seconds.

During the manufacture of the agglomerated beads, after the silane, resin, pigment and crosslinker-blend have been added, but before the small beads are added, the larger beads, which are coated uniformly with the mixture, are prone to sticking together, which prevents the entire surface of each larger bead from being available for placement of the smaller beads. To prevent this premature adhesion, a small quantity of the smaller beads is trickled into the mixture to dust the larger beads in advance of the bulk addition of the remaining smaller beads. By using this "dusting" technique, a full batch results without any "clumping" of larger beads, and with 100% coverage of the large bead with small beads over 100% of the large bead surfaces.

As in the above first described preferred practice of the invention, all of the processing, mixing the various reagents, allowing time for the mixture to cover the initial group of larger glass members and for the chemical reactions to go to completion, resulting in adherence of the small spherical glass members to the larger glass members with an anti-wick coating, occurs over a period of about five and one-half minutes. All steps are preferably performed in ambient conditions, typically at room temperature.

The invention further embraces a pavement for vehicular travel and storage thereon, having enhanced visibility, comprising a load supporting layer selected from the group comprising concrete, asphalt and aggregates; a curable viscous material applied to an upper surface of the load supporting layer; a plurality of retroreflective elements having their lower portions embeddedly retained in the material, with their upper portions protruding above the surface of the material, with each retroreflective element having a generally globular glass central member, a pigmented adhesive layer over the central member, a plurality of peripheral smaller globular glass members connected to the central member by the pigmented adhesive layer, and an anti-wicking agent, all preferably made with the inventive methods disclosed herein.

The invention further includes a method for enhancing visibility of boundaries, lane lines and the like on pavement comprising applying a curable viscous material to a selected pavement portion, such as a boundary, lane line, and the like, for which visibility is to be enhanced, in a thickness to embeddedly retain lower portions of generally globular retroreflective elements having generally globular glass central members, pigmented adhesive layers over the central members, and a plurality of peripheral globular glass members connected to the central members by the pigmented adhesive layers, such that upper portions of the globular retroreflective elements protrude above the material; applying the globular retroreflective elements to the material to an extent that the elements embed themselves sufficiently to be retained by the material when the material has cured; and permitting the material to cure thereby retaining the embedded globular retroreflective elements therein, all preferably made with the inventive methods disclosed herein.

Preferred Reagents

The larger single glass beads that form the center of agglomerated reflective beads in accordance with the invention are preferably Visibead II Plus beads available from Potters Industries, Inc. in Valley Forge, Pa. These beads range in size from 14 to 20 mesh and have a high percentage population that are round.

The silane is preferably Silquest 1120 available from GE Advanced Materials at 187 Danbury Road, Wilton, Conn. 06897.

The white pigment is preferably Tiona 696 titanium dioxide available from Millennium Chemicals, 20 Wight Avenue, Suite 100, Hunt Valley, Md. 21030.

The yellow pigment is preferably Hansa yellow 2GX 70S available from Clariant Corporation, 500 Washington Street, Coventry, R.I. 02416.

The resin for making the resin-pigment intermediate, when the intermediate is used, is preferably Desmophen NH1220, an aspartic ester amine functional resin available from Bayer Materials Science, 100 Bayer Road, Pittsburgh, Pa. 15205.

The preferred accelerator is water.

The plasticizer is preferably Benzoflex 131, available from Velsicol Chemical Company, 10400 W. Miggins Road, Suite 600, Rosemont, Ill. 60015. The preferred aliphatic polyisocyanate is Desmodur N3300, also available from Bayer Materials Science. The aliphatic polyisocyanate is sometimes referred to herein as a "crosslinker" or as a "resin cross-linker".

The second amino silane is preferably Silquest 1170, also available from GE Advanced Materials The smaller glass beads are preferably 1.9 index of refraction glass beads available from Flex-O-Lite, Inc., 125 Cassens Court, Fenton, Mo. 63036.

The preferred anti-wicking agent is Unidyne TG-658 (fluoroalkyl acrylate coopolymer in solution) from Daiken Industries Ltd, Osaka, Japan. Secondary preferences for anti-wicking agents are Capstone ST-100 (formerly Zonyl 8740, fluorochemical dispersion) from DuPont, Wilmington, Del. or Silblock SO (silane ester oligomer solution) from Momentive Performance Materials, Albany, N.Y.

Test and Measurement Procedures

The agglomerated retroreflective glass media fabricated according to the invention have been tested and measured for their retroreflectivity characteristics, for their compliance with applicable color specifications, for their pavement coverage characteristics, for resistance to abrasion, and for resistance to wear. The agglomerated retroreflective glass media in accordance with the invention have been found to have characteristics and values, as respecting these parameters, that are superior in nearly all respects to known commercially available reflective glass highway marking materials.

Retroreflectivity of the agglomerated retroreflective glass media manifesting aspects of the invention were measured using the method set forth in ASTM Specification E1710 entitled "Test Method for Measurement of Retroreflective Pavement Marking Materials with CEN Prescribed Geometry Using Portable Reflectometer." In measuring retroreflectivity, the agglomerated retroreflective glass media were tested (i) alone with the agglomerated retroreflective glass media in a line along a tape without any background paint, (ii) with the agglomerated retroreflective glass media positioned alone on a tape after handling and packaging subsequent to manufacturing, (iii) with the agglomerated retroreflective glass media alone on tape after a shake test (described below) of the agglomerated retroreflective glass media, (iv) with the agglomerated retroreflective glass media placed alone on a painted line, and (v) with the agglomerated retroreflective glass media positioned together with standard glass beads used for highway marking on a painted line in a laboratory after the media and beads had been tested for wear according to the wear test described below.

Results from measuring retroreflectivity are given for the examples and field trials below where retroreflectivity is expressed in millicandelas per square meter per lux, which is the unit of retroreflectivity as specified in ASTM E1710. All measurements of retroreflectivity were made using a commercially available Mirolux 30 retroreflectometer following the procedure set forth in ASTM E1710.

Color of the agglomerated retroreflective glass media in accordance with the invention was measured following the procedure set forth in ASTM E1349 entitled "Test Method for Reflectance Factor and Color by Spectrophotometer Using Bi-Directional Geometry" to determine compliance with ASTM D6628, entitled "Standard Specification for Color of Pavement Marking Materials," which is the applicable standard. One measurement of the color of the agglomerated retroreflective glass media in accordance with the invention was made with the media freely standing, being stacked one on another on a base. A second measurement of the color of the agglomerated retroreflective glass media in accordance with the invention was made with the media interspersed with standard highway marking glass beads on a painted line. A third measurement of the color of the agglomerated retroreflective glass media in accordance with the invention was made after the agglomerated retroreflective glass media were interspersed with standard glass highway marking beads on a painted line after wear testing pursuant to the wear test procedure described below.

For all of agglomerated retroreflective glass media, both white and yellow, fabricated according to the examples herein that are set forth below, the color always fell within the ASTM D6628 color box, and also within the more stringent State of Virginia color box for white and yellow agglomerated beads. This was the case under all measurement conditions.

Evaluation of the coverage of the agglomerated retroreflective glass media in accordance with the invention was based on viewing the agglomerated retroreflective glass media under a microscope using from twenty to forty times magnification. This resulted in subjective views as to the coverage and provided empirical data consistent with the measured values of retroreflectivity. The coverage afforded by the agglomerated retroreflective glass media in accordance with the invention was observed and empirical data recorded as retroreflectivity was measured. This was done (i) viewing the agglomerated retroreflective glass media alone, immediately after manufacture, (ii) viewing the agglomerated retroreflective glass media alone after being handled and packaged in the manufacturing facility, and (iii) viewing the agglomerated retroreflective glass media alone after having undergone the shake test described below.

Agglomerated retroreflective glass media according to the invention have been further evaluated using a "shake test" designed to compare batches of agglomerated retroreflective glass media one to another and to simulate severe abrasion of the agglomerated retroreflective glass media. In the shake test, fifty (50) grams of agglomerated retroreflective glass media according to the invention are combined in a steel one pint can with one hundred (100) grams of grinding media, namely one-half inch by one-half inch Burundum ceramic media available from Fisher Scientific. The can is then shaken vigorously for 60 seconds. After shaking, a 20 mesh screen is used to sieve out any loose, very fine generally spherical glass members. Material that passes through the 20 mesh screen, and hence is smaller than 20 mesh, is then weighed and recorded as a percentage of the agglomerated retroreflective glass media fabricated according to the invention.

The inventors also devised a wear test to expose a finished stripe, consisting of paint having agglomerated retroreflective glass media according to the invention applied thereto and standard highway marking glass beads also applied thereto, to simulate exposure to severe continuous high speed rubber wheel traffic. A sample stripe is prepared on concrete with epoxy paint. Agglomerated retroreflective glass media according to the invention and standard highway marking beads are applied to the epoxy paint stripe. Retroreflectivity is measured and color determined for the stripe, using the ASTM procedures and equipment described above, both before and after the test. For the test, four-inch diameter rubber wheels, each weighted down with twenty pound weights and spinning at a speed of 176 revolutions per minute, run on a ten-inch diameter track to which the epoxy paint stripe, the agglomerated retroreflective glass media, and standard highway marking beads have been applied, for sixty (60) minutes, with a short interruption after each ten minute segment so that temperature does not rise too high due to friction.

After the wear test, measured retroreflectivity has ranged from 800 to 1,000 for both white and yellow samples of the agglomerated retroreflective glass media according to the invention. Moreover, both the white and the yellow samples of the agglomerated retroreflective glass media according to the invention remained in the color box, defined by ASTM D6628, as set forth above, after the wear test.

The test results are set forth, as applicable to the agglomerated retroreflective glass media, with the respective examples.

Example 1

Agglomerated yellow retroreflective beads for highway marking in accordance with the invention were fabricated in a process performed entirely at room temperature by initially combining one quarter gram of water, one gram of amino silane and one thousand grams of glass beads. The glass beads were the preferred Visibead II Plus beads available from Potters Industries, Inc. in Valley Forge, Pa. The beads ranged in size from 14 to 20 mesh and had a high percentage population that were round. The silane was the preferred Silquest 1120 available from GE Advanced Materials at 187 Danbury Road, Wilton, Conn. 06897. The silane provided chemical adhesion for the initial set of 14 to 20 mesh glass beads with subsequent reagents. The water hydrolyzed the silane for added adhesion to the large beads.

A mixture of pigments was prepared consisting of one part yellow pigment, one part white pigment and two parts resin, all such parts being by weight, with the mixture weighing seven (7.0) grams. The white pigment was the preferred Tiona 696 titanium dioxide available from Millennium Chemicals, 20 Wight Avenue, Suite 100, Hunt Valley, Md. 21030; the yellow pigment was the preferred Hansa yellow 2GX 70S available from Clariant Corporation, 500 Washington Street, Coventry, R.I. 02416; and the resin was the preferred Desmophen NH1220, an aspartic ester amine functional resin available from Bayer Materials Science, 100 Bayer Road, Pittsburgh, Pa. 15205.

Once the pigment-resin mixture was prepared, it was added to the mixture of the beads, the silane and water, and blended therewith for 30 seconds.

A plasticizer, namely the preferred Benzoflex 131, available from Velsicol Chemical Company, 10400 W. Miggins Road, Suite 600, Rosemont, Ill. 60015, in the amount of thirty-five hundredths of a gram, and 7.88 grams of the preferred Desmodur N 3300 aliphatic polyisocyanate, also available from Bayer Materials Science, were added and the mixture was then blended for one minute.

Next one gram of the preferred second amino silane, Silquest 1170, also available from GE Advanced Materials, was added and the mixture blended very briefly whereupon 300 grams of very small glass beads, much smaller than the initial glass spheres forming the core of the agglomerated glass bead, were added to the mixture. The small glass beads were the preferred 1.9 index of refraction glass beads available from Flex-O-Lite, Inc., 125 Cassens Court, Fenton, Mo. 63036. The resulting mixture was then blended for one and one-half minutes. A quarter gram of water was also added and blending continued for an additional thirty seconds. The resulting agglomerated retroreflective beads were bright yellow. Total time for the procedure was five (5) minutes.

The resulting mixture was passed over a twenty mesh screen. Only a negligible, essentially immeasurable, amount of material passed thought the twenty mesh screen.

Upon conclusion of the process retroreflectivity was measured as 1100.

Example 2

Agglomerated white retroreflective beads for highway marking were fabricated in a process performed entirely at room temperature by initially combining one quarter gram of water, one gram of amino silane and one thousand grams of glass beads and mixing for about 30 seconds. The glass beads were Visibead II Plus beads, the availability of which is set forth above. The beads ranged in size from 14 to 20 mesh and had a high percentage population that were round. The silane was Silquest 1120, the availability of which is set forth above. The silane provided chemical adhesion for the initial set of glass beads with subsequent reagents and the water hydrolyzed the silane for added adhesion, as explained above.

A mixture was prepared consisting of one part white pigment and one part resin, such parts being by weight, with the mixture weighing eight (8.0) grams. The white pigment was Tiona 696 titanium dioxide available, the availability of which is set forth above while the resin was Desmophen NH1220, an aspartic ester amine functional resin, the availability of which is set forth above.

Once the pigment-resin mixture was prepared, it was added to the mixture of the beads, the silane and water, and blended therewith for about thirty seconds.

A plasticizer, namely Benzoflex 131, the availability of which is set forth in previous examples, in the amount of one-half (0.50) of a gram, and 8.08 grams of Desmodur N 3300 aliphatic polyisocyanate, the availability of which is set forth above, were added and the mixture was then blended for about one minute.

Next one gram of a second amino silane, this time Silquest 1170, the availability of which is set forth in previous examples, was added and 300 grams of small glass beads, namely smaller than the Visibead II Plus glass beads addressed above, were also added to the mixture. The small glass beads were 1.9 index of refraction glass beads, the availability of which is set forth in previous examples. The resulting mixture was then blended for one and one-half minutes. A quarter gram of water was added and blending continued for an additional thirty seconds. The resulting retroreflective beads were brilliant white. Total time for the procedure was four (4) minutes.

The resulting mixture was passed over a twenty mesh screen. Only a negligible, essentially immeasurable amount of material passed thought the twenty mesh screen to be recycled as small beads.

Upon conclusion of the process retroreflectivity was measured as 960. After undergoing the shake test, 3.17 grams of material passed through the twenty mesh screen, indicating that only slightly greater than thirteen percent (13%) of the small beads had broken the adhesive bond to the larger, central beads. When measured after the shake test, retroreflectivity was 800.

Example 3

Agglomerated retroreflective white beads for highway marking were fabricated in a process performed entirely at room temperature by initially combining one quarter gram of water, one gram of amino silane and one thousand grams of glass beads and mixing for about 30 seconds. The glass beads were Visibead II Plus beads, available as set forth above. The beads ranged in size from 14 to 20 mesh and had a high percentage population that were round. The silane was Silquest 1120, available as set forth above. The silane provided chemical adhesion for the initial set of glass beads with subsequent reagents and the water hydrolyzed the silane for added adhesion, as explained above.

A mixture was prepared consisting of one part white pigment and one part resin, both such parts being by weight, with the mixture weighing six (6.0) grams. The white pigment was Tiona 696 titanium dioxide available, available as set forth above, while the resin was Desmophen NH1220, an aspartic ester amine functional resin available as set forth above.

Once the pigment-resin mixture was prepared, it was added to the mixture of the beads, the silane and water, and blended therewith for 30 seconds.

A plasticizer, namely Benzoflex 131, available as set forth above, in the amount of one-half (0.50) of a gram, and 7.96 grams of Desmodur N 3300 aliphatic polyisocyanate, available as set forth above, were added and the mixture was then blended for about thirty (30) seconds.

Next one gram of a second amino silane, this time Silquest 1170, available as set forth above, was added and 300 grams of small glass beads, namely smaller than the Visibead II Plus glass beads addressed above, were also added to the mixture. The small glass beads were 1.9 index of refraction glass beads, available as set forth above. The resulting mixture was then blended for one and one-half minutes. A quarter gram of water was added and blending continued for an additional thirty seconds. The retroreflective beads were bright white. Total time for the process was four (4) minutes.

The resulting mixture was passed over a twenty mesh screen. Only a negligible, essentially immeasurable, amount of material passed thought the twenty mesh screen to be recycled as small beads.

Upon conclusion of the process retroreflectivity was measured as 800. After undergoing the shake test, only 0.15 grams of material passed through the twenty mesh screen, indicating that less two tenths of one percent (<0.2%) of the small beads had broken the adhesive bond to the larger, central beads. When measured after the shake test, retroreflectivity was 600.

Example 4

Agglomerated yellow reflective beads for highway marking were fabricated in a process performed entirely at room temperature by initially combining one quarter gram of water, one gram of amino silane and one thousand grams of glass beads and mixing for about 30 seconds. The glass beads were Visibead II Plus beads, the availability of which is set forth in previous examples. The beads ranged in size from 14 to 20 mesh and had a high percentage population that were round. The silane was Silquest 1120, the availability of which is set forth in previous examples. The silane provided chemical adhesion for the initial set of glass beads with subsequent reagents. The water hydrolyzed the silane for added adhesion.

A mixture of pigments was prepared consisting of one part yellow pigment, one part white pigment and two parts resin, all such parts being by weight, with the mixture weighing eight (8.0) grams. The white pigment was Tiona 696 titanium dioxide available, the availability of which is set forth in previous examples; the yellow pigment was Hansa yellow 2GX 70S, the availability of which is set forth in previous examples; and the resin was Desmophen NH1220, an aspartic ester amine functional resin the availability of which is set forth in previous examples.

Once the pigment-resin mixture was prepared, it was added to the mixture of the beads, the silane and water, and blended therewith for 30 seconds.

A plasticizer, namely Benzoflex 131, the availability of which is set forth in previous examples, in the amount of forty hundredths (0.40) of a gram, and 7.10 grams of Desmodur N 3300 aliphatic polyisocyanate, the availability of which is set forth in previous examples, were added and the mixture was then blended for about one minute.

Next one gram of a second amino silane, this time Silquest 1170, the availability of which is set forth in previous examples, was added and 300 grams of small glass beads, namely smaller than the Visibead II Plus glass beads addressed above, were also added to the mixture. The small glass beads were 1.9 index of refraction glass beads, the availability of which is set forth in previous examples. The resulting mixture was then blended for one and one-half minutes. A quarter gram of water was added and blending continued for an additional thirty seconds. The resulting retroreflective beads were bright yellow. Total processing time was four (4) minutes.

The resulting mixture was passed over a twenty mesh screen. Everything that passed through the twenty mesh screen was collected to be recycled as small beads.

Retroreflectivity was 1150.

Example 5

In the following example all "parts" are parts by weight of the finished agglomerated retroreflective beads.

Agglomerated white retroreflective beads for highway marking were fabricated in a process performed entirely at room temperature by initially combining 0.5 pounds (0.02 parts) of water, 0.98 pounds (0.04 parts) of the preferred amino silane and 1824 pounds (75.15 parts) of the preferred glass beads, and mixing for between fifteen (15) and thirty (30) seconds. The glass beads were the preferred Visibead II Plus and the silane was the preferred Silquest 1120, both as described above. The silane provided chemical adhesion for the initial set of glass beads with subsequent reagents and the water hydrolyzed the silane for added adhesion. After mixing the glass beads were essentially uniformly coated with the amino silane.

Twelve (12) pounds (0.49 parts) of the preferred white pigment and 18.14 pounds (0.75 parts) of a 50/50 mixture (by weight) of the preferred white pigment and the preferred resin were added to the silane-coated beads and the resulting mixture blended for about sixty (60) seconds. The white pigment was the preferred Tiona 696 titanium dioxide and the resin was the preferred Desmophen NH1220, aspartic ester amine functional resin, both as described above.

16.56 pounds (0.68 parts) of the preferred Desmodur N 3300 aliphatic polyisocyanate, as described above, was added together with 0.76 pounds (0.03 parts) of the preferred plasticizer, as described above, and the mixture blended for sixty (60) seconds.

1.84 pounds (0.08 parts) of the preferred second amino silane, Silquest 1170 as described above, 552 pounds (22.74 parts) of the preferred 1.9 refractive index glass beads as described above, and 0.5 pounds (0.02 parts) of water were also added to the mixture. The resulting mixture was then blended for forty-five (45) seconds. After mixing, the 1.9 index refractive index glass beads had covered and adhered to the larger Visibead II Plus glass beads, resulting in agglomerated retroreflective beads for highway marking. The resulting agglomerated retroreflective beads had excellent, brilliant white color. Total mix time for the procedure was 240 seconds.

The resulting collection of agglomerated retroreflective beads was passed over a vibrating 6 mesh screen to remove any collections of beads of excessive size resulting from the large volume and mass of material that was processed.

The further resulting collection of agglomerated reflective beads was then passed over a 20 mesh screen to reclaim, for recycling, any unadhered small beads.

When measured at the conclusion of the process retroreflectivity was measured as 1500. After the agglomerated generally spherical retroreflective media were moved to a packaging area, retroreflectivity was again measured as 1500 and, after being packaged in a bag, measured retroreflectivity was still 1500. When measured after undergoing the shake test, retroreflectivity was 1300. Only 2.25 grams of unadhered small beads passed through the 20 mesh screen after undergoing the shake test. Coverage of the test surface with the agglomerated generally spherical retroreflective media was judged to be excellent, as was the bright white color.

Example 6

In the following example all "parts" are parts by weight of the finished agglomerated retroreflective beads.

Agglomerated white retroreflective beads for highway marking were fabricated in a process performed entirely at room temperature by initially combining 0.25 pounds (0.02 parts) of water, 0.47 pounds (0.04 parts) of amino silane and 912 pounds (75.15 parts) of glass beads, and mixing for between fifteen (15) and thirty (30) seconds. The glass beads were Visibead II Plus and the silane was Silquest 1120, both as described above. The silane provided chemical adhesion for the initial set of glass beads with subsequent reagents and the water hydrolyzed the silane for added adhesion. After mixing the glass beads were essentially uniformly coated with the amino silane.

Six (6) pounds (0.49 parts) of white pigment were added and the mixture blended for sixty (60) seconds whereupon 9.07 pounds (0.75 parts) of fifty-five parts by weight mixture of white pigment and resin were added to the silane-coated beads and the resulting mixture blended again about sixty (60) seconds. The white pigment was Tiona 696 titanium dioxide and the resin was Desmophen NH1220, aspartic ester amine functional resin, both as described above.

Seven and two-tenth (7.2) pounds (0.68 parts) of Desmodur N 3300 aliphatic polyisocyanate, as described above, was added and the mixture was blended for sixty (60) seconds.

Thirty-eight hundredths (0.38) pounds (0.03 parts) of plasticizer, as described above, was added and the mixture blended for about fifteen (15) seconds.

Eight tenths (0.80) pounds (0.08 parts) of a second amino silane, Silquest 1170 as described above, two hundred seventy-six (276) pounds (22.74 parts) of 1.9 refractive index glass beads as described above, and one quarter (0.25) pound (0.02 parts) of water were also added to the mixture. The resulting mixture was then blended for forty-five (45) seconds. After mixing, the 1.9 index refractive index glass beads had covered and adhered to the larger Visibead II Plus glass beads, resulting in agglomerated retroreflective beads for highway marking. Total mix time for the procedure was 240 seconds. The resulting agglomerated reflective beads had an excellent white color.

The resulting collection of agglomerated retroreflective beads was passed over a vibrating 6 mesh screen to remove any collection of beads of excessive size resulting from the large volume and mass of material that was processed.

The further resulting collection of agglomerated reflective beads was then passed over a 20 mesh screen to reclaim, for recycling, any unadhered small beads.

When measured at the conclusion of the process retroreflectivity was measured as 1500. After the agglomerated generally spherical retroreflective media were moved to a packaging area, retroreflectivity was again measured as 1500 and, after being packaged in a bag, measured retroreflectivity was still 1500. When measured after undergoing the shake test, retroreflectivity was 1400.

Example 7

In the following example all "parts" are parts by weight of the finished agglomerated retroreflective beads.

Agglomerated white retroreflective beads for highway marking were fabricated in a process performed entirely at room temperature by initially combining 0.25 pounds (0.02 parts) of water, 0.47 pounds (0.04 parts) of amino silane and 912 pounds (75.15 parts) of glass beads, and mixing for between fifteen (15) and thirty (30) seconds. The glass beads were Visibead II Plus and the silane was Silquest 1120, both as described above. The silane provided chemical adhesion for the initial set of glass beads with subsequent reagents and the water hydrolyzed the silane for added adhesion. After mixing the glass beads were essentially uniformly coated with the amino silane.

Six (6) pounds (0.49 parts) of white pigment were added and blended for about sixty seconds whereupon 9.07 pounds of a 50/50 mix by weight of white pigment and resin were added to the silane-coated beads and the resulting mixture further blended for about sixty (60) seconds. The white pigment was Tiona 696 titanium dioxide and the resin was Desmophen NH1220, aspartic ester amine functional resin, both as described above.

8.28 pounds (0.68 parts) of Desmodur N 3300 aliphatic polyisocyanate, as described above, was added and the mixture was blended for seventy-five (75) seconds.

0.38 pounds (0.03 parts) of plasticizer, as described above, was added and the mixture blended for about fifteen (15) seconds.

0.92 pounds (0.08 parts) of a second amino silane, Silquest 1170 as described above, 276 pounds (22.74 parts) of 1.9 refractive index glass beads as described above, and 0.25 pounds (0.02 parts) were also added to the mixture. The resulting mixture was then blended for sixty (60) seconds. After mixing, the 1.9 index refractive index glass beads had covered and adhered to the larger Visibead II Plus glass beads, resulting in agglomerated retroreflective beads for highway marking. The resulting agglomerated reflective beads had an excellent white color. Total mix time for the procedure was 270 seconds.

The resulting collection of agglomerated retroreflective beads was passed over a vibrating 6 mesh screen to remove any collections of beads of excessive size resulting from the large volume and mass of material that was processed.

The further resulting collection of agglomerated reflective beads was then passed over a 20 mesh screen to reclaim, for recycling, any unadhered small beads.

When measured at the conclusion of the process retroreflectivity was measured as 1500. After the agglomerated generally spherical retroreflective media were moved to a packaging area, retroreflectivity was again measured as 1500 and, after being packaged in a bag, measured retroreflectivity was still 1400. When measured after undergoing the shake test, retroreflectivity was 1400. Only 2.0 grams of unadhered small beads passed through the 20 mesh screen after undergoing the shake test.

Example 8

In the following example all "parts" are parts by weight of the finished agglomerated retroreflective media.

Agglomerated yellow generally spherical retroreflective media for highway marking were fabricated in a process performed entirely at room temperature by initially preparing a dispersion of resin and pigment, with the dispersion comprising three and three quarter (3¾) pounds (0.21 parts) of white pigment, which was the preferred Tiona 696 titanium dioxide, three and three quarter (3¾) pounds (0.21 parts) of yellow pigment, which was the preferred Hansa yellow 2GX 70S, and seven and one half (7½) pounds of resin (0.42 parts), which was the preferred Desmophen NH1220 aspartic ester amine functional resin, with the resulting 14.97 pound dispersion amounting to 0.83 parts of the finished agglomerated generally spherical retroreflective media.

The process next proceeded by combining thirty-eight hundredths (0.38) pounds (0.02 parts) of water, seventy-four hundredths (0.74) pounds (0.04 parts) of the preferred amino silane and 1326 pounds (73.15 parts) of large glass beads, and mixing for between fifteen (15) and thirty (30) seconds. The large glass beads were the preferred Visibead II Plus and the silane was the preferred Silquest 1120, both as described above. The silane provided chemical adhesion for the initial set of large glass beads with subsequent reagents and the water hydrolyzed the silane for added adhesion. After mixing, the large glass beads were essentially uniformly coated with the amino silane. Next, 2.25 lb (0.12 parts) of dry Tiona 696 titanium dioxide white pigment and 2.25 lb (0.12 parts) of Hansa yellow 2GX 70S pigment were added and mixed for 60 seconds.

Next, the dispersion was added and the resulting mixture blended for about sixty (60) seconds.

13.62 pounds (0.75 parts) of the preferred Desmodur N 3300 aliphatic polyisocyanate, as described above, was added together with 0.63 pounds (0.03 parts) of the preferred plasticizer, as described above, and the mixture blended for seventy-five (75) seconds.

1.5 pounds (0.08 parts) of the preferred second amino silane, Silquest 1170 as described above, 450 pounds (24.82 parts) of the preferred 1.9 refractive index glass beads as described above, and 0.38 pounds (0.02 parts) of water were also added to the mixture. The resulting mixture was then blended for sixty (60) seconds. After mixing, the 1.9 index refractive index glass beads had covered and adhered to the larger Visibead II Plus glass beads, resulting in agglomerated spherical retroreflective media for highway marking. The resulting agglomerated spherical retroreflective media displayed an excellent yellow color. Total mix time for the procedure was 270 seconds.

The resulting agglomerated retroreflective media were passed over a vibrating 6 mesh screen to remove any material collections of excessive size resulting from the large volume and mass of material that was processed.

The further resulting collection of agglomerated retroreflective media was then passed over a 20 mesh screen to reclaim, for recycling, any unadhered small beads.

When measured at the conclusion of the process retroreflectivity was measured as 1500. After the agglomerated generally spherical retroreflective media were moved to a packaging area, retroreflectivity was measured as 1450 and, after being packaged in a bag, measured retroreflectivity was still 1450. When measured after undergoing the shake test, retroreflectivity was 1050.

Example 9

In the following example all "parts" are parts by weight of the finished agglomerated retroreflective media.

Agglomerated generally spherical retroreflective yellow media for highway marking were fabricated in a process performed entirely at room temperature by initially preparing a dispersion of resin and pigment, with the dispersion comprising five (5) pounds (0.21 parts) of white pigment, which was the preferred Tiona 696 titanium dioxide, five (5) pounds (0.21 parts) of yellow pigment, which was the preferred Hansa yellow 2GX 70S, and ten (10) pounds of resin (0.42 parts), which was the preferred Desmophen NH1220 aspartic ester amine functional resin, with the resulting 19.96 pound dispersion amounting to 0.83 parts of the finished agglomerated generally spherical retroreflective media.

The process next proceeded by combining over half (0.5) pounds (0.02 parts) of water, ninety-eight hundredths (0.98) pounds (0.04 parts) of the preferred amino silane and 1768 pounds (73.15 parts) of large glass beads, and mixing for between fifteen (15) and thirty (30) seconds. The large glass beads were the preferred Visibead II Plus and the silane was the preferred Silquest 1120, both as described above. The silane provided chemical adhesion for the initial set of large glass beads with subsequent reagents and the water hydrolyzed the silane for added adhesion, as described above. After mixing, the large glass beads were essentially uniformly coated with the amino silane.

Next, 3.0 lb (0.12 parts) of dry Tiona 696 titanium dioxide white pigment and 3.0 lb (0.12 parts) of Hansa yellow 2GX 70S pigment were added and mixed for 60 seconds.

Next, the dispersion was added and the resulting mixture blended for about sixty (60) seconds.

18.16 pounds (0.75 parts) of the preferred Desmodur N 3300 aliphatic polyisocyanate, as described above, was added together with 0.84 pounds (0.03 parts) of the preferred plasticizer, as described above, and the mixture blended for seventy-five (75) seconds.

2.0 pounds (0.08 parts) of the preferred second amino silane, Silquest 1170 as described above, 600 pounds (24.82 parts) of the preferred 1.9 refractive index glass beads as described above, and 0.5 pounds (0.02 parts) of water were also added to the mixture. The resulting mixture was then blended for sixty (60) seconds. After mixing, the 1.9 index refractive index glass beads had covered and adhered to the larger Visibead II Plus glass beads, resulting in agglomerated spherical retroreflective media for highway marking. The resulting agglomerated spherical retroreflective media displayed an excellent yellow color. Total mix time for the procedure was 270 seconds.

The resulting agglomerated retroreflective media were passed over a vibrating 6 mesh screen to remove any material collections of excessive size resulting from the large volume and mass of material that was processed.

The further resulting collection of agglomerated retroreflective media was then passed over a 20 mesh screen to reclaim, for recycling, any unadhered small beads.

When measured at the conclusion of the process retroreflectivity was measured as 1500. After the agglomerated generally spherical retroreflective media were moved to a packaging area, retroreflectivity was again measured as 1500 and, after being packaged in a bag, measured retroreflectivity was 1400. When measured after undergoing the shake test, retroreflectivity was 1050. Only 4.2 grams of unadhered small beads passed through the 20 mesh screen after undergoing the shake test.

Field Trials

Field trials have proven the superiority of the agglomerated generally spherical retroreflective media of the invention for highway marking.

An initial field trial was performed in the set-up yard of a road striping contractor in Parsippany, N.J. A stripe was applied to the yard asphalt at eight miles per hour. The stripe material was Epoplex LS 70 yellow liquid road striping material, available from the Epoplex Division of StonCor Group, Inc. in Maple Shade, N.J. A mixture of six (6) pounds of yellow agglomerated retroreflective glass media, fabricated according to Example 9 above, and ten (10) pounds of standard glass beads for road marking, was applied to the top of the stripe by gravity feed. The feed vehicle moved at eight (8) miles per hour. The rate of application of the yellow agglomerated reflective glass media and of the standard glass beads was six (6) pounds of agglomerated reflective glass media per gallon of Epoplex LS70 liquid material and ten (10) pounds of standard glass beads per gallon of Epoplex LS70 liquid material. The resulting line was intense yellow, extremely bright, and retained those characteristics at night. Retroreflectivity varied from 800 to 1000.

A second field trial was conducted in Parsippany, N.J., on East Halsey Road, which is an approximately one-half mile long road consisting of a base of old asphalt with three or more existing lines on the asphalt. The existing lines were rough with some flaking having occurred. A stripe was applied to the asphalt at eight miles per hour using Epoplex LS 70 yellow liquid road striping material, available from the Epoplex Division of StonCor Group, Inc. as described above. A mixture of six pounds of yellow agglomerated retroreflective glass media, fabricated according to Example 9 above, and ten pounds of standard glass beads for road marking, was applied to the stripe by gravity feed at the same rate as described above, with the vehicle moving at the same speed as described above. Cure of the material was complete in less than five (5) minutes. The resulting line was very yellow, was extremely bright, and retained those characteristics at night. Retroreflectivity ranged between 600 and 800 at the beginning of the stripe and between 700 and 800 along the central portion of the stripe, in both directions.

In yet another field trial, conducted in Mountain Lakes, N.J., on Fanny Road, where the road base was newly applied one week old asphalt, the same materials as used in the Parsippany test, applied at the same rate and same speed, were used. After five (5) minutes, cure of the striping material was so complete that when a car drove across the stripe, no marks resulted. The lines were bright yellow and retained that characteristic at night. Retroreflectivity was between 800 and 1000 in both directions.

The inventive chemistry for fabricating the agglomerated reflective beads, as set forth in the preceding examples, is advantageous for a number of reasons. The coupling agents, namely the silanes, react quickly with the glass and react at reasonable speed with the adhesive. The reactants all have low viscosity at room temperature and hence are easy to handle. Moreover, the reactants are compatible with pigments, both dry pigments and pigments in dispersion form.

The process aspect of the invention may be practiced in several ways. Specifically, the process of the invention may use dry pigment only, or use pigment in a dispersion with resin only, or use both dry pigment and pigment dispersed in a resin, to supply the pigment component.

The reactions are all performed at ambient temperatures. No heating or cooling is involved.

The reactions, when complete, are color stable and weather resistant. The agglomerated retroreflective beads do not yellow, loose their gloss or degrade as a result of exposure to the ultraviolet spectrum of sunlight or from outdoor weathering. The reactions have excellent time profile characteristics, with gelling commencing in approximately one minute and hardening very soon thereafter, allowing enough time for the agents to blend and then harden, thereby retaining the small spherical essentially clear glass beads in fixed connection with the larger central bead thereby forming the agglomerated retroreflective bead product.

Immediately after completion of the manufacturing process, which only takes from four to six minutes, the resulting agglomerated retroreflective beads can be handled in bulk, may be transported, may be packaged and the like. There is no waiting period required.

The reactions can be accelerated with small catalytic amounts of water and do not produce gas that could cause foaming and result in opaqueness of the finished agglomerated retroreflective bead product. The chemistry produces an agglomerated retroreflective bead having excellent physical properties including high tensile strength, toughness and high adhesive strength for adherence of the small spherical glass elements to the larger central globular glass members. Tensile strength of the adhesive has been tested to be over 4,500 psi with an elongation of up to 30% and a tensile modulus of 80 kpsi, providing very, very high strength bonding of the smaller glass beads to the central larger bead.

A major advantage of the agglomerated generally spherical retroreflective media according to the invention is that when white pigment is used and the media are applied to a striping line, the media look white in the daytime and at night. Similarly, when the media are prepared with yellow pigment and applied to a yellow line, the yellow media looks yellow by day and at night as well. This cannot be said of many, if not most, known retroreflective glass based materials.

One practice of the process of applying the agglomerated retroreflective media for highway marking in accordance with the invention is to apply the retroreflective media using a double drop system, where either an epoxy or polyurea two-component material is mixed and applied at a thickness of approximately twenty mils whereupon the agglomerated retroreflective beads are applied at a rate of about five pounds of beads per gallon of the mixed, to-component, either epoxy or polyurea, material and then a standard bead, such as an AASHTO M-247 type 1 bead, is applied at the rate of ten or fifteen pounds per gallon of the mixed two-component epoxy or polyurea material. A preferred epoxy material for use with the agglomerated retroreflective media of the invention is Epoplex LS70, available from the Epoplex Division of StonCor Group, Inc. in Maple Shade, N.J. A preferred polyurea material for use with the agglomerated retroreflective media for highway marking is Epoplex LS90, also available from the Epoplex Division of StonCor Group, Inc. in Maple Shade, N.J.

One suitable apparatus for performing the mixing and blending functions in the fabrication of the retroreflective media according to the invention is the Whiskey Rock two and one-half cubic foot electric mixer, the details of which are available at whiskey-rock.com/products/CP2528. This mixer is suitable for use in manufacturing small size batches of the agglomerated retroreflective media according to the invention.

An even more preferable mixer that has the capacity to manufacture larger size and production batches of the retroreflective agglomerated glass media according to the invention is the Forberg mixer, the details of which are available at www.forbergmixer.com. The Forberg mixer was used in connection with the procedure set forth in examples five through nine hereof.

Tables describing actual production runs and results are shown below:

TABLE 1

| | Batch # | | | | | |
|---|---|---|---|---|---|---|
| | 1 | 2 | 3 | 4 | 5 | 6 |
| Color | Yellow | Yellow | Yellow | Yellow | Yellow | Yellow |
| Total Weight (in pounds) | 2051.9 | 2051.9 | 2051.9 | 2051.9 | 2051.9 | 2051.9 |
| Reagents | Weight in pounds (unless otherwise indicated) | | | | | |
| Large Beads | 1620 | 1620 | 1620 | 1620 | 1620 | 1620 |
| Silane | 1.25 | 1.25 | 1.25 | 1.25 | 1.25 | 1.25 |
| Resin | 13.0 | 13.0 | 13.0 | 13.0 | 13.0 | 13.0 |
| Water (in grams) | 60 | 55 | 50 | 55 | 55 | 55 |
| Titanium Dioxide Pigment | 9 | 9 | 9 | 9 | 9 | 9 |
| Yellow Pigment | 5 | 5 | 5 | 5 | 5 | 5 |
| Crosslinker Blend | 17.0 | 17.0 | 17.0 | 17.0 | 17.0 | 17.0 |
| Small Beads for "dustings" | 66 | 66 | 66 | 66 | 66 | 66 |
| Small Beads | 320 | 320 | 320 | 320 | 320 | 320 |
| Anti-Wicking | 0.6 | 0.6 | 0.6 | 0.6 | 0.6 | 0.6 |
| Blending process | Elapsed times in minutes/seconds | | | | | |
| START—Large Beads and Silane | 0 | 0 | 0 | 0 | 0 | 0 |
| Resin | 30 | 30 | 30 | 30 | 30 | 30 |
| All Pigments | 1:00 | 1:00 | 1:00 | 1:00 | 1:00 | 1:00 |
| Crosslinker Blend | 3:00 | 3:00 | 3:00 | 3:00 | 3:00 | 3:00 |
| Small Beads "dusting" | 3:30 | 3:30 | 3:30 | 3:30 | 3:30 | 3:30 |
| Small Beads | 4:15 | 4:15 | 4:15 | 4:15 | 4:15 | 4:15 |
| Anti-Wicking | 4:45 | 4:45 | 4:45 | 4:45 | 4:45 | 4:45 |
| STOP | 5:30 | 5:30 | 5:30 | 5:30 | 5:30 | 5:30 |
| Product from Mixer/Retroreflectivity * | 1192 | 1120 | 1105 | 1006 | 1084 | 1186 |
| Product in Bag/Retroreflectivty * | 1019 | 991 | 878 | 903 | 945 | 1019 |
| Retroreflectivity in applied strip * | 987 | 986 | 892 | 872 | 954 | 1012 |
| Yield % | 98.2 | 98.3 | 97.8 | 97.5 | 98.7 | 97.6 |

* Retroreflectivity is measured by mcd/sq m/lux (millicandelas per square meter per lux).

TABLE 2

| | Batch # | | | | | | | | | |
|---|---|---|---|---|---|---|---|---|---|---|
| | 1 | 2 | 3 | 4 | 5 | 6 | 7 | 8 | 9 | 10 |
| Color | White | White | White | White | White | White | White | White | White | White |
| Total Weight | 2058.6 | 2058.6 | 2058.6 | 2058.6 | 2058.6 | 2058.6 | 2058.6 | 2058.6 | 2058.6 | 2058.6 |
| Reagents | Weight in pounds (unless otherwise indicated) | | | | | | | | | |
| Large Beads | 1608 | 1608 | 1608 | 1608 | 1608 | 1608 | 1608 | 1608 | 1608 | 1608 |
| Silane | 1.4 | 1.4 | 1.4 | 1.4 | 1.4 | 1.4 | 1.4 | 1.4 | 1.4 | 1.4 |
| Resin | 14.6 | 14.6 | 14.6 | 14.6 | 14.6 | 14.6 | 14.6 | 14.6 | 14.6 | 14.6 |
| Water (in grams) | 45 | 50 | 50 | 50 | 45 | 50 | 50 | 50 | 47 | 45 |
| Titanium Dioxide Pigment | 18.8 | 18.8 | 18.8 | 18.8 | 18.8 | 18.8 | 18.8 | 18.8 | 18.8 | 18.8 |
| Crosslinker Blend | 19.2 | 19.2 | 19.2 | 19.2 | 19.2 | 19.2 | 19.2 | 19.2 | 19.2 | 19.2 |
| Small Beads for "dusting" | 66 | 66 | 66 | 66 | 66 | 66 | 66 | 66 | 66 | 66 |
| Small Beads | 330 | 330 | 330 | 330 | 330 | 330 | 330 | 330 | 330 | 330 |
| Anti-Wicking | 0.6 | 0.6 | 0.6 | 0.6 | 0.6 | 0.6 | 0.6 | 0.6 | 0.6 | 0.6 |
| Blending Process | Elapsed times in minutes/seconds | | | | | | | | | |
| START - Large Beads and Silane | 0 | 0 | 0 | 0 | 0 | 0 | 0 | 0 | 0 | 0 |
| Resin | 30 | 30 | 30 | 30 | 30 | 30 | 30 | 30 | 30 | 30 |

TABLE 2-continued

| | Batch # | | | | | | | | | |
|---|---|---|---|---|---|---|---|---|---|---|
| | 1 | 2 | 3 | 4 | 5 | 6 | 7 | 8 | 9 | 10 |
| All Pigments | 1:00 | 1:00 | 1:00 | 1:00 | 1:00 | 1:00 | 1:00 | 1:00 | 1:00 | 1:00 |
| Crosslinker Blend | 3:00 | 3:00 | 3:00 | 3:00 | 3:00 | 3:00 | 3:00 | 3:00 | 3:00 | 3:00 |
| Small Beads for "dustings" | 3:30 | 3:30 | 3:30 | 3:30 | 3:30 | 3:30 | 3:30 | 3:30 | 3:30 | 3:30 |
| Small Beads | 4:15 | 4:15 | 4:15 | 4:15 | 4:15 | 4:15 | 4:15 | 4:15 | 4:15 | 4:15 |
| Anti-Wicking | 4:45 | 4:45 | 4:45 | 4:45 | 4:45 | 4:45 | 4:45 | 4:45 | 4:45 | 4:45 |
| STOP | 5:30 | 5:30 | 5:30 | 5:30 | 5:30 | 5:30 | 5:30 | 5:30 | 5:30 | 5:30 |
| Product from Mixer/Retroreflectivity* | 978 | 1178 | 1152 | 1128 | 1112 | 1215 | 1158 | 1264 | 1205 | 1164 |
| Product in Bag/Retroreflectivty* | 853 | 1048 | 1039 | 1030 | 980 | 1101 | 1025 | 1100 | 1071 | 1030 |
| Retroreflectivity in applied strip* | 839 | 1073 | 1030 | 964 | 869 | 1062 | 993 | 1041 | 887 | 1020 |
| Yield % | 99.0 | 99.3 | 99.1 | 98.9 | 98.9 | 98.8 | 97.9 | 98.3 | 98.2 | 98.9 |

*Retroreflectivity is measured by mcd/sq m/lux (millicandelas per square meter per lux).

The following is claimed:

1. Retroreflective media securable to a highway by bonding with a viscous strip applied to the highway prior to solidifying cure of the strip, comprising:
   a) a spherical glass central member in the range of from about 14 to about 20 mesh;
   b) a pigmented adhesive layer over the central member;
   c) a plurality of peripheral spherical glass members in the range of from about 325 to about 400 mesh connected to the central member by the pigmented adhesive layer.

2. The media of claim 1 wherein the pigmented layer is a mixture of pigment and resin.

3. The media of claim 2 wherein the pigmented layer is about 40% pigment by weight.

4. The media of claim 1 in which the thickness of the pigmented layer is less than the diameter of the peripheral spherical glass members.

5. The retroreflective media for highway marking of claim 1 wherein the spherical central member has an average diameter of from about 0.6 of a millimeter to about 2.0 millimeters; wherein the pigmented adhesive layer has a thickness of from about 10 to about 50 micrometers, and the peripheral spherical glass members have an average diameter of from about 20 to about 100 micrometers.

6. The media of claim 1 wherein average thickness of the pigmented adhesive layer is from about 30% to about 50% of the average diameter of the peripheral spherical glass members.

7. The media of claim 1 wherein the spherical glass central member has an average diameter of from about 0.85 of a millimeter to about 1.4 millimeters; the pigmented adhesive layer has a thickness of from about 10 to about 40 micrometers; and the peripheral spherical glass members have an average diameter of from about 30 to about 60 micrometers.

8. The media of claim 1 wherein the spherical glass central member has an average diameter of about 1.2 millimeters; the pigmented adhesive layer has a thickness of about 15 micrometers; and the peripheral spherical glass members have an average diameter of about 45 micrometers.

9. A pavement for vehicular travel and storage thereon, having enhanced visibility, comprising:
   a) a load supporting layer selected from the group comprising concrete, asphalt and aggregates;
   b) a curable viscous material applied to an upper surface of the load supporting layer;
   c) a plurality of generally spherical retroreflective elements having their lower portions embedded in and retained by the material, with their upper portions protruding above the surface of the material, each retroreflective element having a spherical glass central member, a pigmented adhesive layer comprising resin and at least one aliphatic polyisocyanate cross-linker and covering the central member and a plurality of peripheral smaller spherical glass members connected to the central member by the pigmented adhesive layer.

10. A method for enhancing visibility of boundaries, lane lines and the like on pavement comprising:
   a) applying a curable viscous material to a selected pavement portion, such as a boundary, lane line, and the like, for which visibility is to be enhanced, in a thickness to retain lower portions of generally spherical retroreflective elements embedded in the material, the elements comprising spherical glass central members, pigmented adhesive layers, said layers comprising resin and at least one aliphatic polyisocyanate cross-linker, covering the central members, and a plurality of peripheral spherical glass members connected to the central members by the pigmented adhesive layers, such that upper portions of the generally spherical retroreflective elements protrude above the material;
   b) applying the generally spherical retroreflective elements to the material to an extent that the elements embed themselves sufficiently to be retained by the material when the material has cured;
   c) permitting the material to cure thereby retaining the embedded generally spherical retroreflective elements therein.

11. A method of enhancing visibility of boundaries, lane lines and the like on pavement comprising:
   a) applying a curable viscous material to a selected pavement portion, such as a boundary, lane line, and the like, for which visibility is to be enhanced, in a thickness to retain lower portions of generally spherical retroreflective elements embedded in the material, the elements comprising spherical glass central members, pigmented adhesive layers, said layers comprising resin and at least one aliphatic polyisocyanate cross-linker, covering the central members, and a plurality of peripheral spherical glass members connected to the central members by the pigmented adhesive layers, such that upper portions of the generally spherical retroreflective elements protrude above the material;

b) applying the generally spherical retroreflective elements to the material to an extent that the elements embed themselves sufficiently to be retained by the material when the material has cured;

c) permitting the material to cure thereby retaining the embedded generally spherical retroreflective elements therein; wherein the method is performed in fewer than 6 minutes.

12. Retroreflective media securable to a highway by bonding with a viscous strip applied to the highway prior to solidifying cure of the strip, comprising:

a) a generally spherical glass central member in the range of from about 14 to about 20 mesh;

b) a pigmented adhesive layer comprising resin and at least one cross-linker, said cross linker comprising aliphatic polyisocyanate, the layer covering the central member;

c) a plurality of peripheral generally spherical glass members in the range of from about 325 to about 400 mesh connected to the central member by the pigmented adhesive layer.

13. Retroreflective media of claim 12 wherein the pigmented adhesive layer further comprises reagents that react adhesively during fabrication of the media to secure the peripheral members to the central member.

14. Retroreflective media of claim 12 wherein the peripheral spherical glass members have their lower portions embedded in and thereby retained by the pigmented adhesive layer sufficiently to rigidly and fixedly form part of the retroreflective media but are separated from the generally spherical central member, with the peripheral spherical glass members having their upper portions protruding above the surface of the layer.

15. Retroreflective media of claim 12 wherein the pigmented adhesive layer is of sufficient thickness to retain lower portions of the peripheral generally spherical members embedded therein when the pigmented adhesive layer has cured.

16. Retroreflective media of claim 12 in which the exterior of the retroreflective media is essentially completely covered and exclusively defined by the peripheral spherical glass members.

17. Retroreflective media securable to a highway by bonding with a viscous strip applied to the highway prior to solidifying cure of the strip, consisting of:

a) a generally spherical glass central member in the range of from about 14 to about 20 mesh;

b) an adhesive layer comprising pigment, resin and aliphatic polyisocyanate cross-linker, the layer covering the central member;

c) a plurality of peripheral generally spherical glass members in the range of from about 325 to about 400 mesh connected to the central member by the pigmented adhesive layer, the peripheral glass members having their lower portions embedded and retained in the pigmented adhesive layer sufficiently to rigidly and fixedly form part of the retroreflective media but being separated from the central member, the peripheral glass members having their upper portions protruding above the surface of the layer, the exterior of the retroreflective media being essentially completely covered and exclusively defined by the peripheral glass members.

18. A pavement for vehicular travel and storage thereon, having enhanced visibility, consisting of:

a) a load supporting layer selected from the group comprising concrete, asphalt and aggregates;

b) a curable viscous material applied to an upper surface of the load supporting layer;

c) a plurality of generally spherical retroreflective elements in the range of from about 14 to about 20 mesh, having their lower portions embedded and retained in the viscous material, with their upper portions protruding above the surface of the viscous material, each retroreflective element having:

i) a generally spherical glass central member, ii) an adhesive layer comprising pigment, resin and at least one cross-linker in the form of aliphatic polyisocyanate, the layer covering the central member; and iii) a plurality of peripheral generally spherical glass members in the range of from about 325 to about 400 mesh connected to the central member by the adhesive layer, the peripheral glass members having their lower portions embedded retained in the adhesive layer sufficiently to rigidly and fixedly form exterior parts of the retroreflective elements but being separated from the central member, the peripheral glass members having their upper portions protruding above the surface of the adhesive layer, the exteriors of the retroreflective elements being essentially completely covered by the peripheral glass members.

* * * * *